(12) United States Patent
Yang et al.

(10) Patent No.: US 12,546,913 B2
(45) Date of Patent: Feb. 10, 2026

(54) METASURFACE OPTICAL DEVICE AND FABRICATION METHOD THEREOF

(71) Applicant: Shphotonics Ltd, Suzhou (CN)

(72) Inventors: Xinzheng Yang, Sammamish, WA (US); Lei Sun, Suzhou (CN); Bing Qiu, Suzhou (CN)

(73) Assignee: Shphotonics Ltd, Suzhou (CN)

( * ) Notice: Subject to any disclaimer, the term of this patent is extended or adjusted under 35 U.S.C. 154(b) by 352 days.

(21) Appl. No.: 18/357,482

(22) Filed: Jul. 24, 2023

(65) Prior Publication Data

US 2024/0061148 A1 Feb. 22, 2024

(30) Foreign Application Priority Data

Aug. 18, 2022 (CN) .......................... 202210993526.9

(51) Int. Cl.
*G02B 1/00* (2006.01)
(52) U.S. Cl.
CPC .................................... *G02B 1/002* (2013.01)
(58) Field of Classification Search
CPC .......... G02B 1/002; G02B 5/00; G03F 7/0005
USPC ....................................................... 359/741
See application file for complete search history.

(56) References Cited

U.S. PATENT DOCUMENTS

| | | | |
|---|---|---|---|
| 2018/0217395 A1 | 8/2018 | Lin et al. | |
| 2019/0243155 A1* | 8/2019 | You | G02B 27/4272 |
| 2022/0082897 A1* | 3/2022 | Zhou | H04N 25/11 |
| 2022/0299760 A1* | 9/2022 | Fan | G02B 27/0012 |
| 2022/0393434 A1* | 12/2022 | Ryabko | H01S 5/18302 |
| 2023/0067758 A1* | 3/2023 | Loh | G02B 5/003 |
| 2023/0236414 A1* | 7/2023 | Qiu | G02B 1/002 |
| | | | 428/172 |
| 2024/0004173 A1* | 1/2024 | Sun | G02B 17/023 |

FOREIGN PATENT DOCUMENTS

| | | |
|---|---|---|
| CN | 113885106 A | 1/2022 |
| CN | 112117640 B | 2/2022 |

* cited by examiner

*Primary Examiner* — William R Alexander
(74) *Attorney, Agent, or Firm* — ANOVA LAW GROUP, PLLC

(57) ABSTRACT

A metasurface optical device includes a substrate, a film layer, and a metasurface structural unit array. The substrate includes a first surface and a second surface opposite to each other in a thickness direction of the substrate. The film layer is formed on the first surface of the substrate and includes at least one film group of films distributed at different positions on the first surface. Each film group includes one film, or a plurality of films stacked one over another in the thickness direction of the substrate. Each of the plurality of films includes a material with a corresponding refractive index to enhance transmission and/or reflection of light. The metasurface structural unit array includes a plurality of metasurface structural units formed on a side of the first film layer away from the substrate and extending in a direction away from the substrate.

20 Claims, 20 Drawing Sheets

801

```
┌─────────────────────────────────────┐
│ Form a first film material layer, a  │
│ sacrificial material layer, a mask   │
│ material layer, and a photoresist    │──901
│ material layer sequentially on       │
│ the first surface of the substrate   │
└─────────────────────────────────────┘
                  │
                  ▼
┌─────────────────────────────────────┐
│ Pattern the photoresist material     │
│ layer and the mask material layer    │
│ through lithography and etching      │──902
│ to expose a portion of the           │
│ sacrificial material layer           │
└─────────────────────────────────────┘
                  │
                  ▼
┌─────────────────────────────────────┐
│ Etch the exposed portion of the      │
│ sacrificial material layer and a     │
│ corresponding portion of the first   │
│ film material layer are etched to    │──903
│ form the first film group and expose │
│ a portion of the substrate           │
└─────────────────────────────────────┘
                  │
                  ▼
┌─────────────────────────────────────┐
│ Form a second film group on the      │──904
│ exposed portion of the substrate     │
└─────────────────────────────────────┘
```

Form a metasurface material layer, a mask material layer, and a photoresist material layer that are stacked with each other and on a side of the first film layer away from the substrate — 1901

Pattern the photoresist material layer and the mask material layer through photolithography and etching to expose a portion of the metasurface material layer — 1902

Etch the exposed portion of the metasurface material layer to form the metasurface structural unit array — 1903

Deposit a second film material layer on the exposed portion of the first film layer and an end of the plurality of metasurface structural units away from the substrate — 1904

FIG. 19

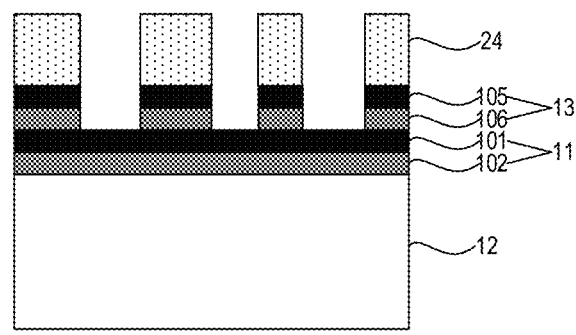
FIG. 24
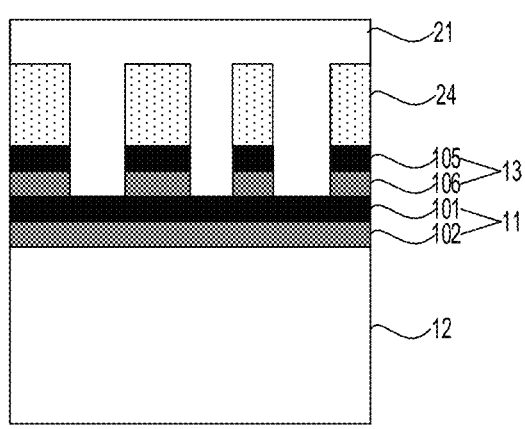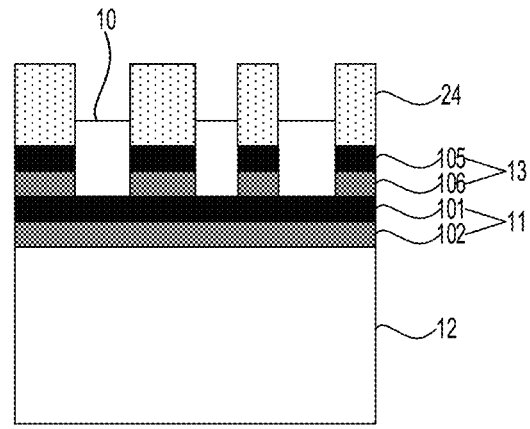
FIG. 25

802

Form a second film material layer, a sacrificial material layer, a mask material layer, and a photoresist material layer sequentially on a side of the first film layer away from the substrate —2601

Pattern the photoresist material layer and the mask material layer through the photolithography and etching to expose a portion of the sacrificial material layer —2602

Etch the exposed portion of the sacrificial material layer and the corresponding portion of the second film material layer to form the second film layer and expose a portion of the first film layer —2603

Form the plurality of metasurface structural units on the exposed portion of the first film layer —2604

Form a third film layer on an end of the plurality of metasurface structural units away from the substrate —2605

FIG. 26

METASURFACE OPTICAL DEVICE AND FABRICATION METHOD THEREOF

CROSS-REFERENCE TO RELATED APPLICATION

This application claims priority to Chinese Application No. 202210993526.9, filed on Aug. 18, 2022, the entire content of which is incorporated herein by reference.

TECHNICAL FIELD

The present disclosure relates to the metasurface technology field and, in particular, to a metasurface optical device, a method for fabricating the metasurface optical device, and an optical system.

BACKGROUND

Metasurface refers to an artificial material formed by arranging subwavelength-sized structure units on a plane according to a design. In a visible light wavelength band, a basic structure unit of metasurface is smaller than a working wavelength with a size in an order of tens to hundreds of nanometers. Metasurface can realize flexible and effective control of the characteristics, such as propagation direction, polarization mode, amplitude, and phase, of electromagnetic waves.

Metasurface is ultra-light and ultra-thin. A metasurface optical device made based on the metasurface can have excellent optical performance, small volume, and high level of integration in functions compared to a conventional optical device. Metasurface optical devices can be broadly applied to portable small apparatus such as wearable augmented reality apparatus, wearable virtual reality apparatus, and lens in mobile terminals.

A widely used method in conventional optical thin film technology for coating thin films on a conventional optical device is using vacuum sputtering. Thus, the reflectance and transmittance of light incident on the conventional optical device are controlled to meet different needs. Coating the surface of a conventional optical device can be calculated and designed through the principle of light interference. However, the calculation is only suitable for smooth surfaces and cannot be used to calculate the influence of a metasurface structural unit layer. When the coating structure designed by using the conventional coating calculation method is directly applied to metasurfaces, significant errors or even a negative effect can occur. Therefore, a new design method and a new implementation process are needed for the transmittance and reflectance enhancing coating film on metasurfaces.

SUMMARY

Embodiments of the present disclosure provide a metasurface optical device, including a substrate, a film layer, and a metasurface structural unit array. The substrate includes a first surface and a second surface opposite to each other in a thickness direction of the substrate. The first film layer is formed on the first surface of the substrate and includes at least one film group distributed at different positions of the first surface. Each film group includes one film or a plurality of films stacked one over another in the thickness direction of the substrate. Each of the plurality of films includes a material with a corresponding refractive index to enhance transmission and/or reflection of light. The metasurface structural unit array includes a plurality of metasurface structural units formed on a side of the first film layer away from the substrate and extending in a direction away from the substrate.

Embodiments of the present disclosure provide a method for manufacturing a metasurface optical device. The method includes forming a first film layer on a first surface of a substrate and forming a metasurface structural unit array on a side of the first film layer away from the substrate. The first film layer includes at least one film group distributed at different positions of the first surface. Each film group includes one film or a plurality of films stacked one over another in a thickness direction of the substrate. Each of the plurality of films includes a material with a corresponding refractive index to enhance transmission and/or reflection of light. The metasurface structural unit array includes a plurality of metasurface structural units extending in a direction away from the substrate.

Embodiments of the present disclosure provide an optical system including a metasurface optical device. The device includes a substrate, a film layer, and a metasurface structural unit array. The substrate includes a first surface and a second surface opposite to each other in a thickness direction of the substrate. The first film layer is formed on the first surface of the substrate and includes at least one film group distributed at different positions of the first surface. Each film group includes one film or a plurality of films stacked one over another in the thickness direction of the substrate. Each of the plurality of films includes a material with a corresponding refractive index to enhance transmission and/or reflection of light. The metasurface structural unit array includes a plurality of metasurface structural units formed on a side of the first film layer away from the substrate and extending in a direction away from the substrate.

BRIEF DESCRIPTION OF THE DRAWINGS

FIG. 9 is a schematic flowchart of a process for forming a first film layer in FIG. 2 of the method shown in FIG. 8 according to some embodiments of the present disclosure.

FIG. 19 is a schematic flowchart showing processes for forming a metasurface array in the method shown in FIG. 8 according to some embodiments of the present disclosure.

FIG. 24 is a schematic diagram showing the result of a process in FIG. 21 according to some embodiments of the present disclosure.

FIG. 25 is a schematic diagram showing the result of a process in FIG. 21 according to some embodiments of the present disclosure.

FIG. 26 is a schematic flowchart showing processes for forming a metasurface array in the method shown in FIG. 8 according to some embodiments of the present disclosure.

DETAILED DESCRIPTION OF THE EMBODIMENTS

Figure 1:
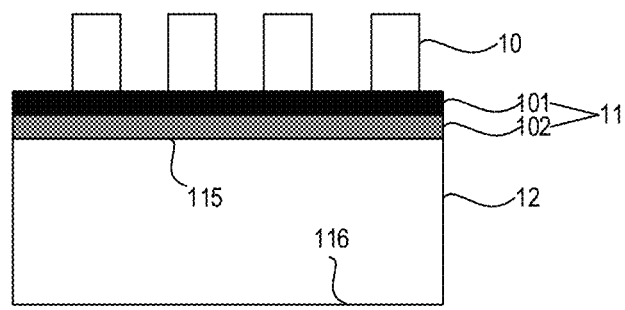
FIG. 1 is a schematic cross-sectional diagram of a metasurface optical device according to some embodiments of the present disclosure.

In the following, some example embodiments are described. As those skilled in the art would recognize, the described embodiments can be modified in various manners, all without departing from the spirit or scope of the present disclosure. Accordingly, the drawings and descriptions are illustrative in nature and not limiting.

In the present disclosure, terms such as "first," "second," and "third" can be used to describe various elements, components, regions, layers, and/or parts. However, these elements, components, regions, layers, and/or parts should not be limited by these terms. These terms are only used to distinguish one element, component, region, layer, or part from another element, component, region, layer, or layer. Therefore, a first element, component, region, layer, or part discussed below can also be referred to as a second element, component, region, layer, or part, which does not constitute a departure from the teachings of the present disclosure.

A term specifying a relative spatial relationship, such as "below," "beneath," "lower," "under," "above," or "higher," can be used in the disclosure to describe the relationship of one or more elements or features relative to other one or more elements or features as illustrated in the drawings. These relative spatial terms are intended to also encompass different orientations of the device in use or operation in addition to the orientation shown in the drawings. For example, if the device in a drawing is turned over, an element described as "beneath," "below," or "under" another element or feature would then be "above" the other element or feature. Therefore, an example term such as "beneath" or "under" can encompass both above and below. Further, a term such as "before," "in front of," "after," or "subsequently" can similarly be used, for example, to indicate the order in which light passes through the elements. A device can be oriented otherwise (e.g., being rotated by 90 degrees or being at another orientation) while the relative spatial terms used herein still apply. In addition, when a layer is referred to as being "between" two layers, it can be the only layer between the two layers, or there can be one or more intervening layers. In this disclosure, if a light beam encounters a first element and then reaches a second element, the second element is referred to as being downstream the first element or downstream the first element in an optical path, and correspondingly the first element is referred to as being upstream the second element or upstream the second element in the optical path.

Terminology used in the disclosure is for the purpose of describing the embodiments only and is not intended to limit the present disclosure. As used herein, the terms "a," "an," and "the" in the singular form are intended to also include the plural form, unless the context clearly indicates otherwise. Terms such as "comprising" and/or "including" specify the presence of stated features, entities, steps, operations, elements, and/or parts, but do not exclude the existence or addition of one or more other features, integers, steps, operations, elements, parts, and/or combinations thereof. As used herein, the term "and/or" includes any and all combinations of one or more of the listed items. The phrases "at least one of A and B" and "at least one of A or B" mean only A, only B, or both A and B.

When an element or layer is referred to as being "on," "connected to," "coupled to," or "adjacent to" another element or layer, the element or layer can be directly on, directly connected to, directly coupled to, or directly adjacent to the other element or layer, or there can be one or more intervening elements or layers. In contrast, when an element or layer is referred to as being "directly on," "directly connected to," "directly coupled to," or "directly adjacent to" another element or layer, then there is no intervening element or layer. "On" or "directly on" should not be interpreted as requiring that one layer completely covers the underlying layer.

In the disclosure, description is made with reference to schematic illustrations of example embodiments (and intermediate structures). As such, changes of the illustrated shapes, for example, as a result of fabrication techniques and/or tolerances, can be expected. Thus, embodiments of the present disclosure should not be interpreted as being limited to the specific shapes of regions illustrated in the drawings, but are to include deviations in shapes that result, for example, from fabrication. Therefore, the regions illustrated in the drawings are schematic and their shapes are not intended to illustrate the actual shapes of the regions of the device and are not intended to limit the scope of the present disclosure.

Unless otherwise defined, all terms (including technical and scientific terms) used herein have the same meaning as commonly understood by those of ordinary skill in the art to which this disclosure belongs. Terms such as those defined in commonly used dictionaries should be interpreted to have meanings consistent with their meanings in the relevant field and/or in the context of this disclosure, unless expressly defined otherwise herein.

As used herein, the term "substrate" can refer to the substrate of a diced wafer, or the substrate of an un-diced wafer. Similarly, the terms "chip" and "die" can be used interchangeably, unless such interchange would cause conflict. The term "layer" can include a thin film, and should not be interpreted to indicate a vertical or horizontal thickness, unless otherwise specified.

FIG. 1 is a schematic cross-sectional diagram of a metasurface optical device 100 according to some embodiments of the present disclosure. As shown in FIG. 1, the optical device 100 includes a substrate 12, a first film layer 11, and a metasurface structural unit array including a plurality of metasurface structural units 10.

The substrate 12 includes a first surface 115 and a second surface 116 that are opposite to each other in a thickness direction of the substrate 12.

The first film layer 11 is formed on the first surface 115 of the substrate 12 and includes at least one film group distributed at different positions on the first surface 115. Each film group includes at least one film stacked in the thickness direction of the substrate 12. Each film includes a material with a corresponding refractive index to enhance transmission and/or reflection of light.

As shown in FIG. 1, the first film layer 11 includes a film 101 and a film 102 stacked in the thickness direction of the substrate 12. The film 101 and film 102 that are stacked can be alternating layers of any combination of silicon dioxide, titanium dioxide, aluminum oxide, silicon nitride, aluminum nitride, or amorphous silicon to reduce reflectance (enhance transmission) and/or reduce transmittance (enhance reflection) at an interface between the plurality of metasurface structural units 10 and the substrate 12 and reduce reflectance (enhance transmission) and/or reduce transmittance (enhance reflection) at an interface between the air and the substrate 12.

The metasurface structural unit array includes the plurality of metasurface structural units 10 extending along a direction away from the substrate 12 and on a side away from to the first film layer 11.

In some embodiments, the first film layer 11 includes two films (film 101 and film 102) stacked in the thickness direction of the substrate 12. In some other embodiments, the first film layer 11 can include any number of films stacked with each other along the thickness direction of the substrate 12, which is not limited here.

The first film layer 11 includes a plurality of film groups distributed at different positions of the first surface 115, which is described below in connection with FIG. 2.

Figure 2:
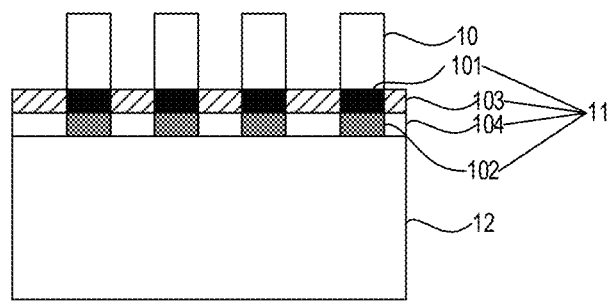
FIG. 2 is a schematic cross-sectional diagram of a metasurface optical device according to some embodiments of the present disclosure.

FIG. 2 is a schematic cross-sectional diagram of a metasurface optical device 200 according to some embodiments of the present disclosure. As shown in FIG. 2, the optical device 200 includes a substrate 12, a first film layer 11, and a metasurface array including a plurality of metasurface structural units 10.

The first film layer 11 includes a first film group (film 101 and film 102) and a second film group (film 103 and film 104). The second film group (film 103 and film 104) can be made of a different material than the first film group (film 101 and film 102). Each metasurface structural unit 10 of the plurality of metasurface structural units 10 is directly on a corresponding portion of the first film group (film 101 and film 102).

In some embodiments, the first film group (film 101 and film 102) can be designed based on the refractive index of each metasurface structural unit 10 and the refractive index of the substrate 12 to reduce reflectance (enhance transmission) and/or reduce transmittance (enhance reflection) at the interface between the plurality of metasurface structural units 10 and the substrate 12.

The second film group (film 103 and film 104) can be designed according to the refractive index of the air and the refractive index of the substrate 12 to reduce reflectance (enhance transmission) and/or reduce transmittance (enhance reflection) at the interface between the air and the substrate 12.

To further reduce reflectance (enhance transmission) and/or reduce transmittance (enhance reflection) at the interface between the air and the substrate and the interface between the metasurface structural units and substrate, a corresponding film layer can be deposited on a surface of the first film layer away from the substrate and an end of the plurality of metasurface structural units away from the substrate.

Figure 3:
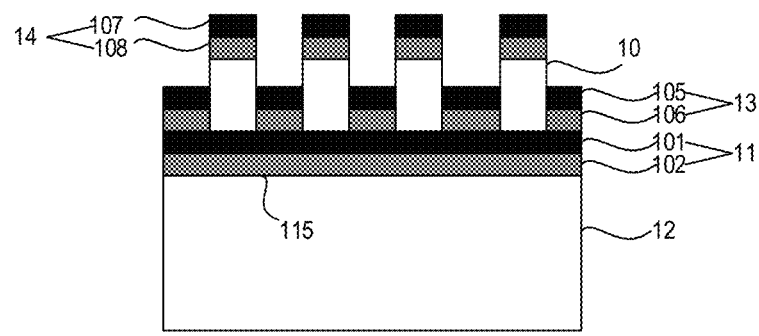
FIG. 3 is a schematic cross-sectional diagram of a metasurface optical device according to some embodiments of the present disclosure.

FIG. 3 is a schematic cross-sectional diagram of a metasurface optical device 300 according to some embodiments of the present disclosure. The first film layer 11 is formed on the first surface 115 of the substrate 12 and includes two films, a film 101 and a film 102. The second film layer 13 is formed on the surface of the first film layer 11 away from the substrate 12 and includes at least one film group distributed at different positions on the surface. Similar to the first film layer 11, each film group of the second film layer 13 can include at least one film stacked with each other in the thickness direction of the substrate 12. Each film can include a material with a corresponding refractive index to enhance the transmission and/or reflection of light. The plurality of metasurface structural unit 10 extend along a direction away from the substrate 12 and exceeds the second film layer 13.

As shown in FIG. 3, the second film layer 13 includes a film 105 and a film 106 stacked with each other along the thickness direction of the substrate 12 to reduce reflectance (enhance transmission) and/or reduce transmittance (enhance reflection) at the interface between air and the substrate 12.

A third film layer 14 is formed at one end of the plurality of metasurface structural units 10 away from the substrate 12 and includes at least one film group distributed at different metasurface structural units 10. Similar to the first film layer 11 and the second film layer 13, the third film layer 14 includes at least one film stacked with each other in the thickness direction of the substrate 12. Each film can include a material with a corresponding refractive index to enhance light transmission and/or reflection.

The third film layer 14 includes two films (film 107 and film 108) stacked with each other in the thickness direction of the substrate 12 to reduce reflectance (enhance transmission) and/or reduce transmittance (enhance reflection) at the interface between the air and the plurality of metasurface structural units 10. In some embodiments, the third film layer 14 and the second film layer 13 can be made of the same material. In some embodiments, the material and the thickness of the film 107 can be the same as the material and the thickness of the film 105, and the material and the thickness of the film 108 can be the same as the material and the thickness of the film 106.

FIG. 3 shows that each of the second film layer 13 and the third film layer 14 includes two films stacked with each other in the thickness direction of the substrate 12. In other embodiments, each of the second film layer 13 and the third film layer 14 layers can include any number of films that are stacked with each other in the thickness direction of the substrate, which is not limited here.

The material for fabricating the second film layer 13 and the material for fabricating the third film layer 14 can be different.

In some embodiments, the material of the third film layer 14 and the material of the second film layer 13 can be different.

Figure 4:
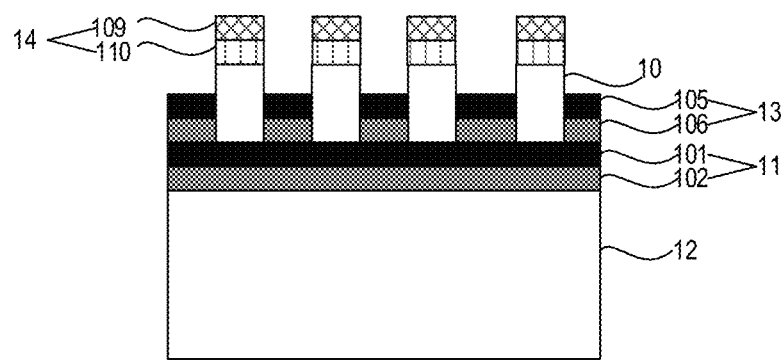
FIG. 4 is a schematic cross-sectional diagram of a metasurface optical device according to some embodiments of the present disclosure.

FIG. 4 is a schematic cross-sectional diagram of a metasurface optical device 400 according to some embodiments of the present disclosure. As shown in FIG. 4, the first film layer 11 is formed on a first surface 115 of a substrate 12. The first film layer 11 includes two films (film 101 and film 102) that are stacked with each other in the thickness direction of the substrate 12. The second film layer 13 is formed on the surface of the first film layer 11 away from the substrate 12. The second film layer 13 includes a film 105 and a film 106 stacked with each other in the thickness direction of the substrate 12 to reduce reflectance (enhance transmission) and/or reduce transmittance (enhance reflection) at the interface between the air and the substrate 12.

Different from the optical device 300, the optical device 400 further includes a third film layer 14. The third film layer 14 can be made of a material different from the material of the second film layer 13. The third film layer 14 includes a film 109 and a film 10 stacked with each other in the thickness direction of the substrate 12.

In some embodiments, the third film layer 14 including the film 109 and the film 110 can be designed for the refractive index of the air and the refractive index of the plurality of metasurface structural units 10 to reduce reflectance (enhance transmission) and/or reduce transmittance (enhance reflection) at the interface between the air and the metasurface structural units 10. The material and the thickness of the film 109 can be different from the film 106. The material and the size of the film 110 can be different from the film 107.

Figure 5:
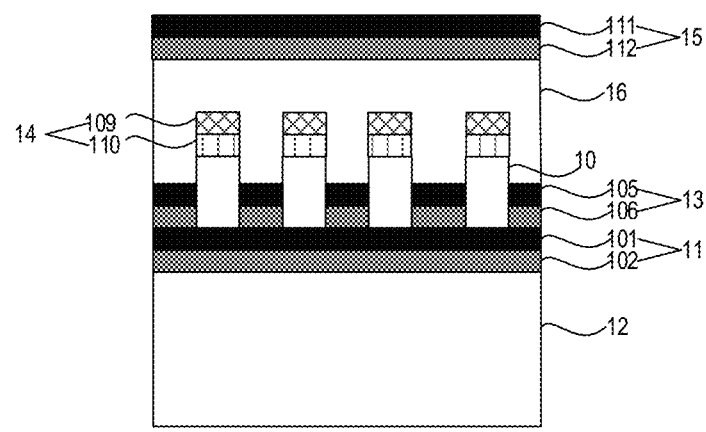
FIG. 5 is a schematic cross-sectional diagram of a metasurface optical device according to some embodiments of the present disclosure.

FIG. 5 is a schematic cross-sectional diagram of a metasurface optical device 500 according to some embodiments of the present disclosure. The optical device 500 further includes a fourth film layer 15 and a protective material layer 16 based on the optical device 400 shown in FIG. 4.

As shown in FIG. 5, the fourth film layer 15 is formed on a side of the plurality of metasurface structural units 10 away from the substrate 12 and includes at least one film group. Each film group can include at least one film stacked with each other in the thickness direction of the substrate 12. Each film can include the material with a corresponding refractive index to enhance the transmission and/or the reflection of light.

The fourth film layer 15 includes two films (film 111 and film 112) stacked with each other in the thickness direction of the substrate 12. The protective material layer 16 is formed between the fourth film layer 15 and the first film layer 11. In some embodiments, the fourth film layer 15 can be designed based on the refractive index of the air and the refractive index of the protective material layer 16 to reduce reflectance (enhance transmission) and/or reduce transmittance (enhance reflection) at the interface between the air and the protective material layer 16. The second film layer 13 can be designed based on the refractive index of the protective material layer 16 and the refractive index of the substrate 12 to reduce reflectance (enhance transmission) and/or reduce transmittance (enhance reflection) at the interface between the protective material layer 16 and the substrate 12. The third film layer 14 can be designed based on the refractive index of the protective material layer 16 and the refractive index of the metasurface structural units 10 to reduce reflectance (enhance transmission) and/or reduce transmittance (enhance reflection) at the interface between the protective material layer 16 and the metasurface structural units 10.

Although FIG. 5 shows that the fourth film layer 15 includes the two films stacked in the thickness direction of the substrate 12, in some other embodiments, the number of the films included in the fourth film layer 15 can be any number, which is not limited.

Figure 6:
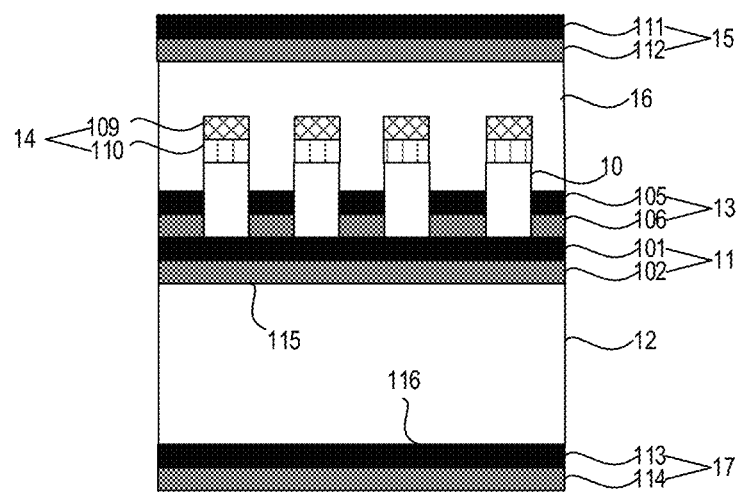
FIG. 6 is a schematic cross-sectional diagram of a metasurface optical device according to some embodiments of the present disclosure.

FIG. 6 is a schematic cross-sectional diagram of a metasurface optical device 600 according to some embodiments of the present disclosure. The metasurface optical device 600 includes a fifth film layer 17 in addition to the optical device 500 shown in FIG. 5.

The fifth film layer 17 is formed on the second surface 116 of substrate 12 and includes at least one film group distributed at different positions of the second surface 116. Each film group can include at least one film stacked in the thickness direction of substrate 12. Each film can include a material of a corresponding refractive index to enhance the transmittance and/or the reflectance.

The fifth film layer 17 includes the two films (film 113 and film 114) stacked in the thickness direction of the substrate 12. The fifth film layer 17 can be used to reduce reflectance (enhance transmission) and/or reduce transmittance (enhance reflection) at the interface between the air and the substrate 12 based on the refractive index of the substrate 12 and the refractive index of the air.

Although FIG. 6 shows that the fifth film layer 17 includes the two films stacked in the thickness direction of the substrate 12, in some other embodiments, the number of the films included in the fifth film layer 17 can be any number, which is not limited.

In some embodiments, a metasurface optical array can be formed on a side of the fourth film layer 15 away from the protection layer 16 of the optical device 600 shown in FIG. 6. Thus, an element can be additionally formed at the metasurface optical array, such as a second film group, a third film group, and a protective material to cause the metasurface optical device to perform more complex control on the incident light to realize more functions.

Figure 7:
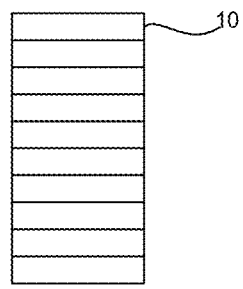
FIG. 7 is a schematic diagram showing a metasurface structural unit of the metasurface optical device of any of FIG. 1 to FIG. 5 according to some embodiments of the present disclosure.

FIG. 7 is a schematic diagram showing a metasurface structural unit of the metasurface optical device of any of FIG. 1 to FIG. 5 according to some embodiments of the present disclosure. In FIG. 7, each metasurface structural unit 10 of a plurality of metasurface structural units 10 includes a plurality of distributed feedback (DFB) films stacked in the thickness direction of the substrate 12. In some embodiments, the plurality of DFB films can be used to perform control on polarization, amplitude, phase, polarization state, and propagation mode of light passing through, and also filter the light in a manner such as high-pass filtering, low-pass filtering, or band-pass filtering.

In practical applications, a plurality of films for enhancing transmission and reflection on a surface of an optical device can be calculated and designed through the principle of light interference. However, a film structure designed using such a method can only be suitable for a smooth optical interface. A subwavelength structure layer in the metasurface has different transmission and reflection characteristics for electromagnetic waves compared to the smooth interface, which is closely related to the sizes and shapes of subwavelength structure units and the wavelengths of incident light. When a film structure designed using a computational method for conventional coating is directly applied to the metasurface, a large error, even an opposite effect could happen. Thus, a new design method and a new implementation process are needed for coating the optical device with the metasurface structural unit to enhance transmission and reflection. The process methods for fabricating the optical devices shown in FIG. 1 to FIG. 6 are described in detail in connection with FIG. 8 to FIG. 31.

Figure 8:
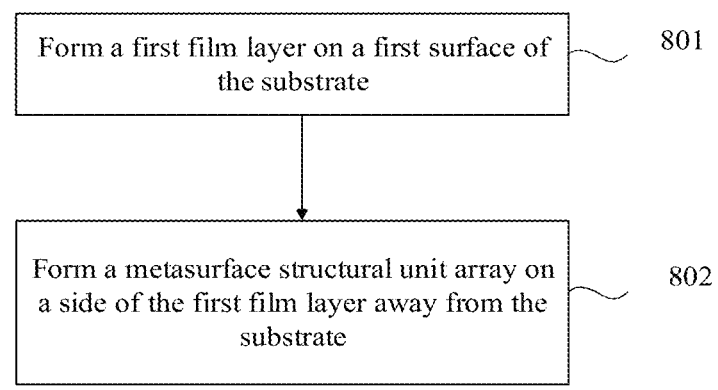
FIG. 8 is a schematic flowchart of a method for fabricating a metasurface optical device according to some embodiments of the present disclosure.

FIG. 8 is a schematic flowchart of a method 800 for fabricating a metasurface optical device according to some embodiments of the present disclosure.

At 801, a first film layer is formed on a first surface of a substrate. The first film layer includes at least one film group located at different positions on the first surface. Each film group includes at least one film stacked in the thickness direction of the substrate. Each film includes a material with a corresponding refractive index to enhance the transmission and/or reflection of light.

Process 801 is described in detail in conjunction with FIGS. 9 to 14.

At 802, a metasurface structural unit array is formed on a side of the first film layer away from the substrate. The metasurface structural unit array includes a plurality of metasurface structural units extending in a direction away from the substrate.

Process 802 is described in detail in conjunction with FIGS. 15 to 27.

FIG. 9 is a schematic flowchart of process 801 for forming a first film layer in FIG. 2 of the method shown in FIG. 8 according to some embodiments of the present disclosure. FIGS. 10 to 14 sequentially illustrate schematic diagrams of the process in FIG. 9 according to exemplary embodiments. Process 801 is described in detail in conjunction with FIGS. 9 to 14.

According to some embodiments, as shown in FIG. 2, in the optical device 200, the at least one film group of the first film layer 11 includes a first film group (film 101 and film 102) and a second film group (film 103 and film 104). The first film group (film 101 and film 102) can be made of a material different from the material of the second film group (film 103 and film 104).

At 901, a first film material layer, a sacrificial material layer, a mask material layer, and a photoresist material layer are sequentially formed on the first surface of the substrate.

Figure 10:
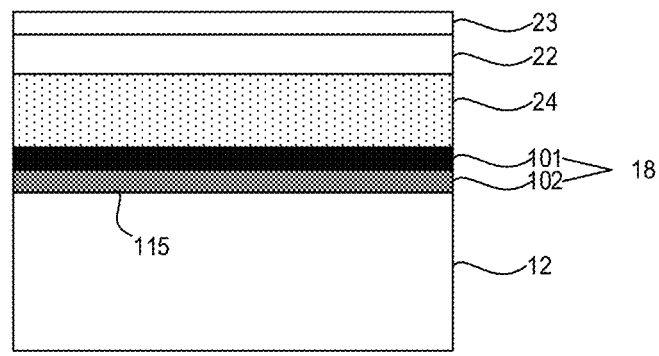
FIG. 10 is a schematic diagram showing the result of a process in FIG. 9 according to some embodiments of the present disclosure.

First, the first film material layer 18 is formed on the first surface 115 of the substrate 12. The first film material layer 18 includes film 101 and film 102. The sacrificial material layer 24 is deposited on a side of the first film material layer 18 away from the first surface 115. The mask material layer 22 is deposited on a side of the sacrificial material layer 24 away from the first film material layer 18. Then, a photoresist material layer 23 is deposited on a side of the mask material layer 22 away from the sacrificial material layer 24 to obtain the optical device 1000 as shown in FIG. 10. The sacrificial material layer 24 includes but is not limited to silicon dioxide, polysilicon, and/or photoresist. The mask material layer 22 includes but is not limited to titanium nitride, silicon nitride, and/or silicon dioxide. The photoresist material layer 23 includes but is not limited to photoresist.

At 902, the photoresist material layer and the mask material layer are patterned through lithography and etching to expose a portion of the sacrificial material layer.

Figure 11:
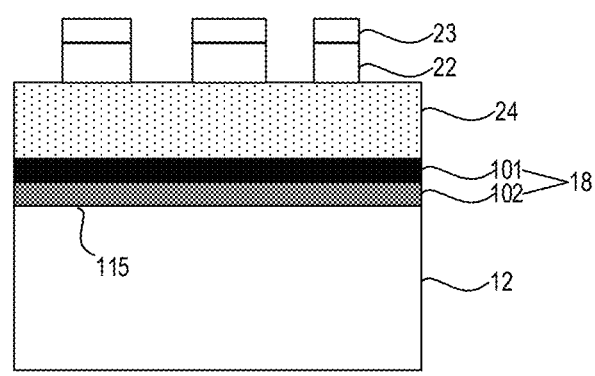
FIG. 11 is a schematic diagram showing the result of a process in FIG. 9 according to some embodiments of the present disclosure.

The optical device 1000 can be further processed. The photoresist material layer 23 can be patterned to form an array pattern on a side of the mask material layer 22 away from the sacrificial material layer. The array pattern can include one of a positive replication or a negative replication of the metasurface structural unit array. Based on the array pattern, the portion of the sacrificial material layer 24 can be exposed by etching the photoresist material layer 23 and the mask material layer 22 to obtain the optical device 1100 as shown in FIG. 11.

At 903, the exposed portion of the sacrificial material layer and a corresponding portion of the first film material layer are etched to form the first film group and expose a portion of the substrate. The corresponding portion of the first film material layer is located under the exposed portion of the sacrificial material layer.

Figure 12:
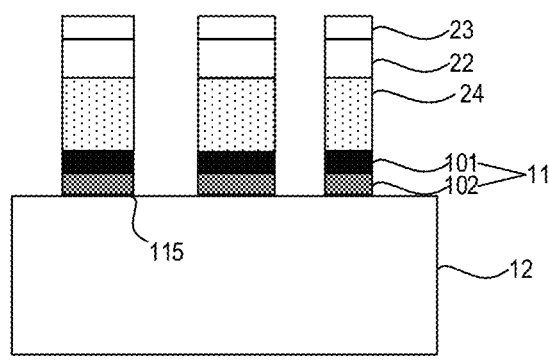
FIG. 12 is a schematic diagram showing the result of a process in FIG. 9 according to some embodiments of the present disclosure.

The optical device 1100 can be further processed. Based on the array pattern, the sacrificial material 24 and the first film material layer 18 can be further etched to obtain an optical device 1200 as shown in FIG. 12. The optical device 1200 includes a first film group 11. The first film group 11 includes film 101 and film 102.

Figure 13:
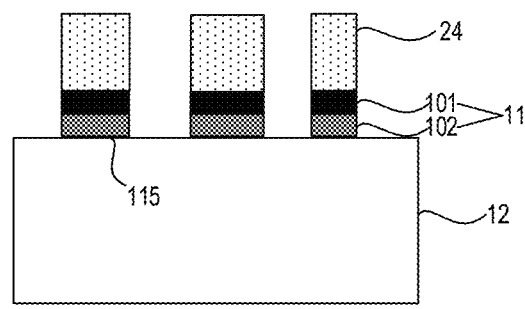
FIG. 13 is a schematic diagram showing the result of a process in FIG. 9 according to some embodiments of the present disclosure.
Figure 14:
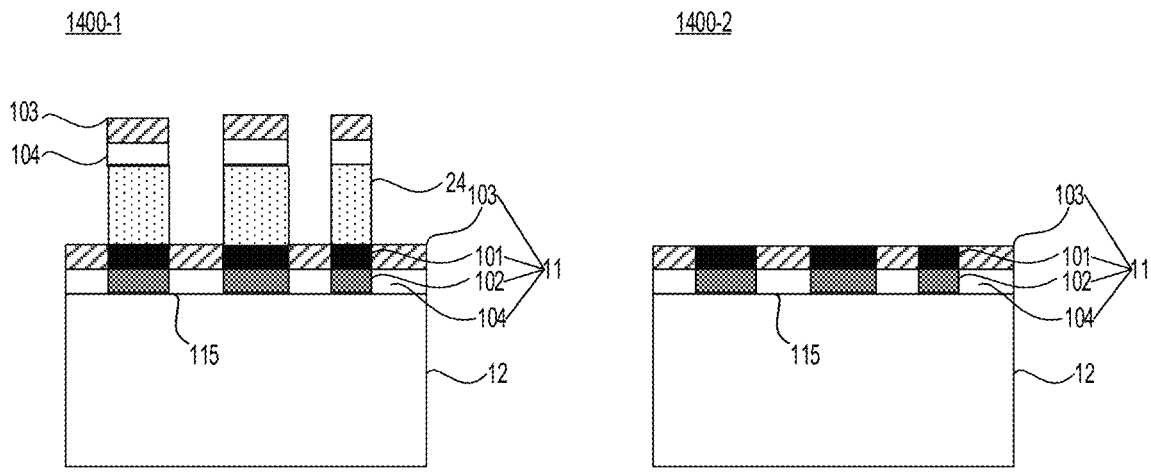
FIG. 14 is a schematic diagram of showing the result of a process in FIG. 9 according to some embodiments of the present disclosure.

The optical device 1200 can be further processed to remove the photoresist material layer 23 and the mask material layer 22 to obtain an optical device 1300 as shown in FIG. 13.

At 904, a second film group is formed on the exposed portion of the substrate.

The optical device 1300 can be further processed. A second film group material layer can be anisotropy deposited on the etched first film group 11. The second film group material layer includes a film 103 and a film 104. An optical device 1400-1 as shown on the left side of FIG. 14 can be obtained. Then, the sacrificial material layer 24 and the second film group (film 103 and film 104) are on one side of the sacrificial material layer 24 away from the first film group 11. Thus, the first film group (film 101 and film 102) and the second film group (film 103 and film 104) can be uniformly distributed at different positions of the first surface 115 of the substrate 12 to obtain an optical device 1400-2 on the right side of FIG. 14.

In some embodiments, the metasurface structural unit array can be directly formed on the first film group (film 101 and film 102) of the first film layer 11 to obtain the optical device 200 as shown in FIG. 2. The process for forming the metasurface structural unit array is described in detail in conjunction with FIGS. 15 to 27.

Process 802 performed by photolithography is described in detail in connection with FIGS. 15 to 20, and process 802 performed by a separation method is described in detail in connection with FIGS. 21 to 27.

Figure 15:
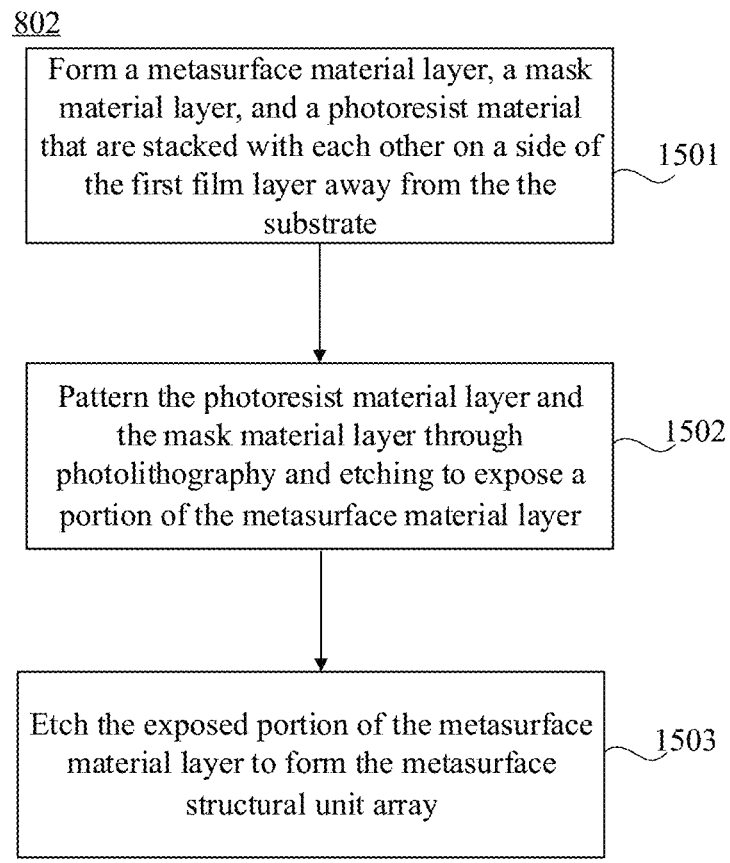
FIG. 15 is a schematic flowchart showing processes for forming a metasurface array in the method shown in FIG. 8 according to some embodiments of the present disclosure.
Figure 16:
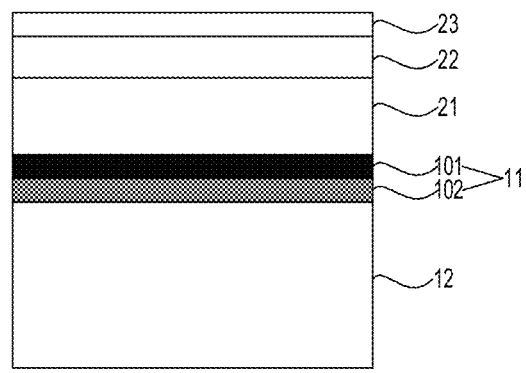
FIG. 16 is a schematic diagram showing the result of a process in FIG. 15 according to some embodiments of the present disclosure.
Figure 17:
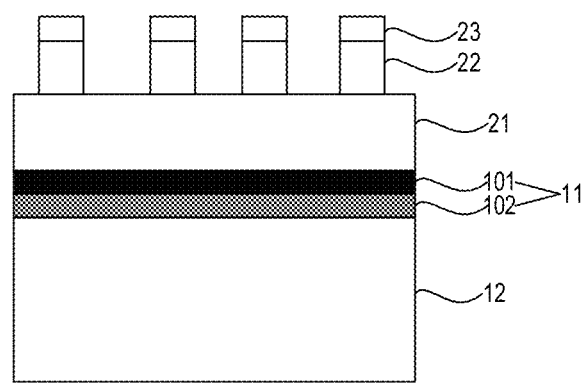
FIG. 17 is a schematic diagram showing the result of a process in FIG. 15 according to some embodiments of the present disclosure.
Figure 18:
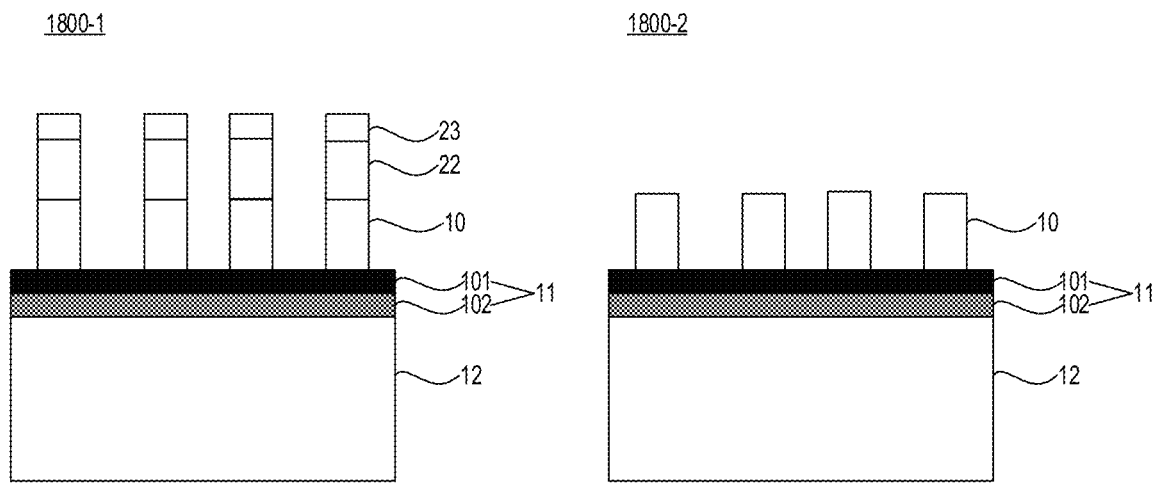
FIG. 18 is a schematic diagram showing the result of a process in FIG. 15 according to some embodiments of the present disclosure.

FIG. 15 is a schematic flowchart showing process 802 for forming a metasurface array in the method 800 shown in FIG. 8 according to some embodiments of the present disclosure. FIG. 16 to FIG. 18 are schematic diagrams showing the result of a process 802 in FIG. 15 according to some embodiments of the present disclosure.

At 1501, a metasurface material layer, a mask material layer, and a photoresist material that are stacked with each other are formed on a side of the first film layer away from the substrate.

The metasurface material layer 21 that is used to fabricate the metasurface structural unit array can be deposited on a side of the first film layer 21 away from the substrate 12. The first film layer includes a film 101 and a film 102. Then, the mask material layer 22 can be deposited on a side of the metasurface material layer 21 away from the first film layer 11. Subsequently, the photoresist material layer 23 can be deposited on a side of the mask material layer 22 away from the metasurface material layer 21 to obtain an optical device 1600 shown in FIG. 16.

At 1502, the photoresist material layer and the mask material layer are patterned through photolithography and etching to expose a portion of the metasurface material layer.

The optical device 1600 can be further processed to pattern the photoresist material layer 23 to form an array pattern on a side of the mask material layer 22 away from the metasurface material layer 21. The array pattern can include one of the positive replication or the negative replication of the metasurface structural unit array. Based on the array pattern, the photoresist material layer 23 and the mask material layer 22 can be etched to obtain an optical device 1700 shown in FIG. 17.

At 1503, the exposed portion of the metasurface material layer is etched to form the metasurface structural unit array.

The optical device 1700 can be further processed to further etch the exposed portion of the metasurface material layer 21 to form the metasurface structural unit 10 to obtain an optical device 1800-1 shown on the left side of FIG. 18.

The optical device 1800-1 can be further processed to remove the mask material layer 22 and the photoresist material layer 23 to form the metasurface structural unit array 10 on a side of the first film layer 11 away from the substrate 12 to obtain an optical device 1800-2 shown on the right side of FIG. 18.

The optical device 1800-2 has the same structure as the optical device 100 shown in FIG. 1. In some embodiments, the optical device 1800-2 can be further processed to obtain the optical device 300 shown in FIG. 3.

Figure 20:
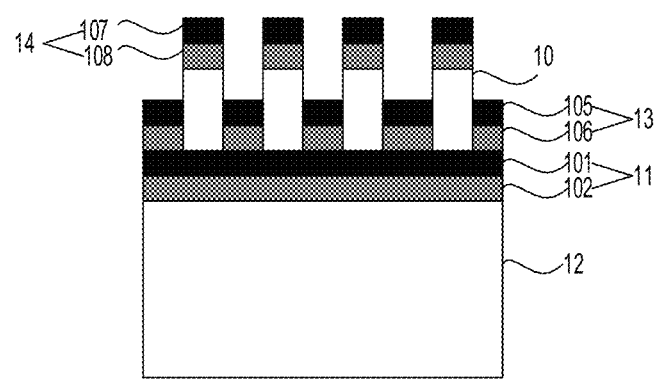
FIG. 20 is a schematic diagram showing the result of a process in FIG. 19 according to some embodiments of the present disclosure.

FIG. 19 is a schematic flowchart showing process 802 for forming the metasurface array in the method 800 shown in FIG. 8 according to some embodiments of the present disclosure. FIG. 20 illustrates a schematic diagram showing the result of a process 802 shown in FIG. 19 according to exemplary embodiments.

At 1901, a metasurface material layer, a mask material layer, and a photoresist material layer that are stacked with each other are formed on a side of the first film layer away from the substrate.

At 1902, the photoresist material layer and the mask material layer are patterned through photolithography and etching to expose a portion of the metasurface material layer.

Process 1901 and process 1902 are the same as process 1501 and process 1502 shown in FIG. 15 and the descriptions thereof are not repeated here.

At 1903, the exposed portion of the metasurface material layer is etched to form the metasurface structural unit array.

In some embodiments, the exposed portion of the metasurface material layer 21 can be etched to expose a portion of the first film layer 11 to obtain the optical device 1800-1 shown in FIG. 18. Then, the mask material layer 22 and the photoresist material layer 23 can be removed from the optical device 1800-1 to obtain the optical device 1800-2.

At 1904, a second film material layer is deposited on the exposed portion of the first film layer and an end of the plurality of metasurface structural units away from the substrate, a second film layer is formed from the second film material layer deposited on the exposed portion of the first film layer, a third film layer is formed from the second film material layer deposited on the end of the plurality of metasurface structural units away from the substrate. The second film layer and the third film layer each include at least one film group. Each film group includes at least one film stacked in the thickness direction of the substrate. Each film includes a material with a corresponding refractive index to enhance transmission and/or reflection of light.

The optical device 1800-2 can be further processed to anisotropically deposit the second film material layer on the plurality of metasurface structural units 10. The second material layer deposited on the exposed portion of the first film layer 11 can form the second film layer 13 (film 105 and film 106). The second film material layer deposited on the end of the plurality of metasurface structural units 10 away from the substrate 12 can form the third film layer 14 (film 107 and film 108) to obtain an optical device 2000 shown in FIG. 20. In some embodiments, the material and the thickness of the film 107 can be the same as those of the film 105. The material and the thickness of the film 108 can be the same as those of the film 106.

The optical device 2000 has the same structure as the optical device 300 shown in FIG. 3.

Figure 21:
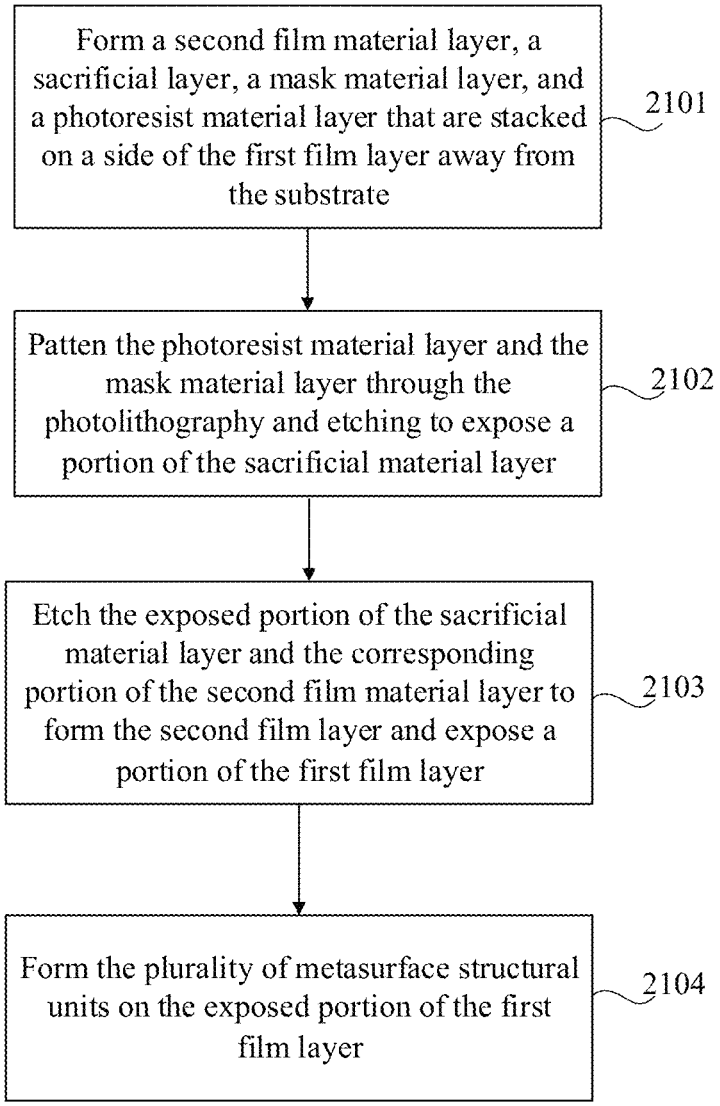
FIG. 21 is a schematic flowchart showing processes for forming a metasurface array in the method shown in FIG. 8 according to some embodiments of the present disclosure.
Figure 22:
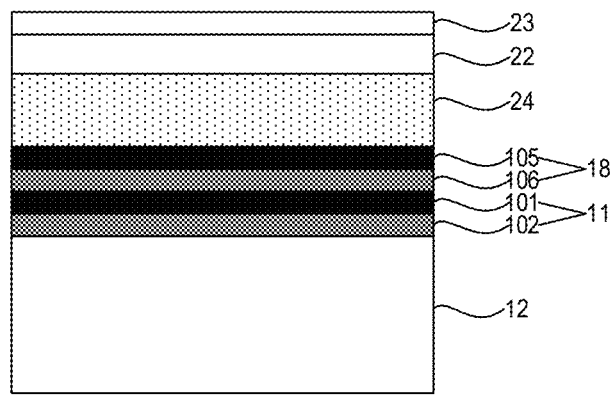
FIG. 22 is a schematic diagram showing the result of a process in FIG. 21 according to some embodiments of the present disclosure.
Figure 23:
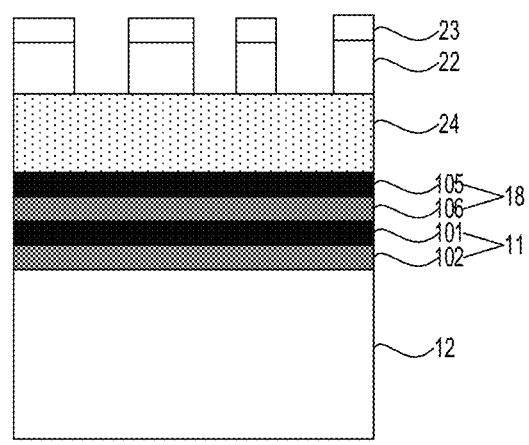
FIG. 23 is a schematic diagram showing the result of a process in FIG. 21 according to some embodiments of the present disclosure.

FIG. 21 is a schematic flowchart showing process 802 for forming the metasurface array in the method 800 shown in FIG. 8 according to some embodiments of the present disclosure. FIG. 22 to FIG. 25 sequentially illustrate results of process 802 shown in FIG. 21 according to some embodiments of the present disclosure.

At 2101, a second film material layer, a sacrificial layer, a mask material layer, and a photoresist material layer that are stacked are formed on a side of the first film layer away from the substrate. The second film layer includes at least one film group. Each film group includes at least one film stacked in the thickness direction of the substrate. Each film includes a material with a corresponding refractive index to enhance transmission and/or reflection of light.

The second film material layer 18 can be deposited on a side of the first film layer 11 away from the substrate 12. The second film material layer 18 includes two films (film 105 and film 106) stacked in the thickness direction of the substrate 12. The sacrificial material layer 24 can be deposited on a side of the second film material layer 18 away from the first film layer 11 (the first film layer 11 including film 101 and film 102). The photoresist material layer 22 can be deposited on a side of the sacrificial material layer 24 away from the second film material layer 18. The photoresist material layer 23 can be deposited on a side of the mask material layer 22 away from the sacrificial material layer 24 to obtain an optical device 2200 shown in FIG. 22.

At 2102, the photoresist material layer and the mask material layer are patterned through the photolithography and etching to expose a portion of the sacrificial material layer.

The optical device 2200 can be further processed by patterning the photoresist material layer to form an array pattern on a side of the mask material layer 22 away from the sacrificial material layer 24. The array pattern can include one of a positive replication or a negative replication of the metasurface structural unit array. Based on the array pattern, the photoresist material layer 23 and the mask material layer 22 can be etched to form a plurality of gaps and a plurality of protrusions corresponding to the array pattern in the mask material layer 22 and the photoresist material layer 23 to obtain an optical device 2300 shown in FIG. 23.

At 2103, the exposed portion of the sacrificial material layer and the corresponding portion of the second film material layer are etched to form the second film layer and expose a portion of the first film layer. The corresponding portion of the second film material layer is under the exposed portion of the sacrificial material layer.

The optical device 2300 can be further processed to first etch the sacrificial material layer 24 and the second film material layer 18 along an extension direction of the plurality of gaps to obtain the second film layer 13. Then, the photoresist material layer 23 and the mask material layer 22 can be moved to obtain an optical device 2400 shown in FIG. 24.

At 2104, the plurality of metasurface structural units are formed on the exposed portion of the first film layer. The plurality of metasurface structural units extend beyond the second film layer in a direction away from the substrate.

The optical device 2400 can be further processed to deposit the metasurface material layer 21 to fill the plurality of gaps of the sacrificial material layer 24 to obtain an optical device 2500-1 shown on the left side of FIG. 25.

The optical device 2500-1 can be further processed to remove an excess portion of the metasurface material layer 21 and form the plurality of metasurface structural units 10 on a side of the first film layer 11 away from the substrate 12 to obtain an optical device 2500-2 shown on the right side of FIG. 25.

Figure 27:
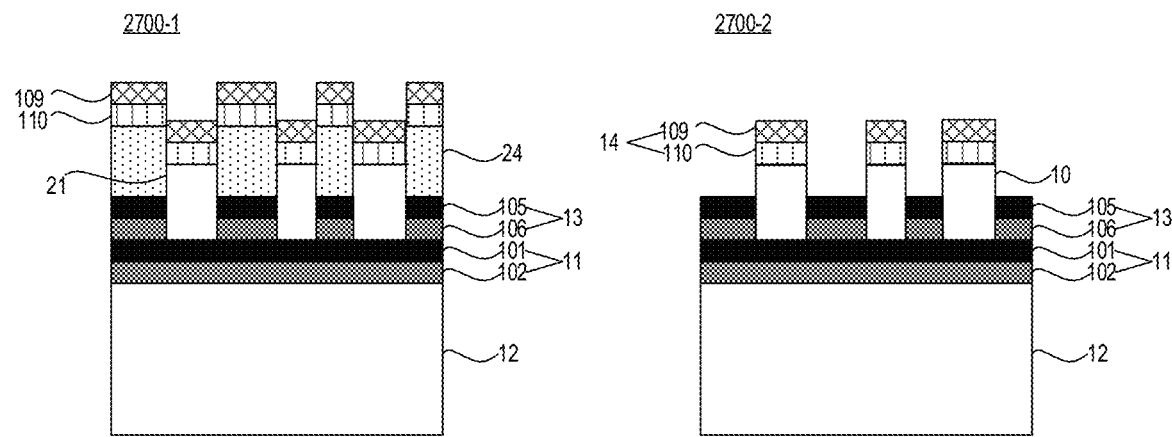
FIG. 27 is a schematic diagram showing the result of a process in FIG. 26 according to some embodiments of the present disclosure.

FIG. 26 is a schematic flowchart showing a process for forming the metasurface array in the method shown in FIG. 8 according to some embodiments of the present disclosure. FIG. 27 is a schematic diagram showing the result of a process in FIG. 26 according to exemplary embodiments.

At 2601, a second film material layer, a sacrificial material layer, a mask material layer, and a photoresist material layer are sequentially formed on a side of the first film layer away from the substrate.

At 2602, the photoresist material layer and the mask material layer are patterned through the photolithography and etching to expose a portion of the sacrificial material layer.

At 2603, the exposed portion of the sacrificial material layer and the corresponding portion of the second film material layer are etched to form the second film layer and expose a portion of the first film layer.

At 2604, the plurality of metasurface structural units are formed on the exposed portion of the first film layer.

Process 2601 to process 2604 are the same as process 2101 to process 2104 shown in FIG. 21 and the descriptions thereof are not repeated here.

At 2605, a third film layer is formed on an end of the plurality of metasurface structural units away from the substrate. The third film layer includes at least one film group. Each film group includes at least one film stacked in the thickness direction of the substrate. Each film includes a material with a corresponding refractive index to enhance transmission and/or reflection of light.

The third film material layer (including film 109 and film 110) is anisotropy deposited on the plurality of metasurface structural units of the optical device 2500-2 shown in FIG. 25 to obtain an optical device 2700-1 on the left side of FIG. 27.

The optical device 2700-1 can be further processed to remove the sacrificial material layer 24 and the third film material layer on a side of the sacrificial material layer 24 away from the second film layer 13 to form the third film layer 14 (including film 109 and film 110) on the end of the plurality of metasurface structural units 10 away from the substrate 12 to obtain an optical device 2700-2 shown in FIG. 27.

The optical device 2700-2 has the same structure as the optical device 400 shown in FIG. 4.

Figure 28:
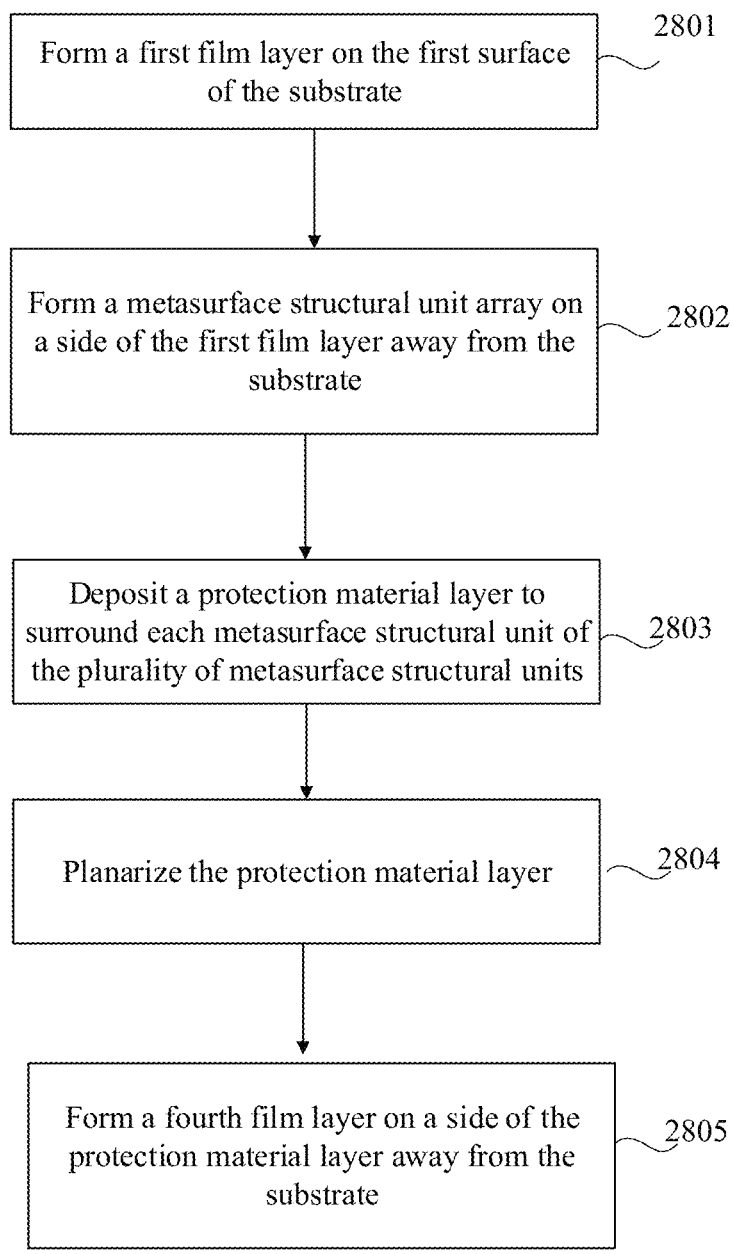
FIG. 28 is a schematic flowchart of a method for fabricating a metasurface optical device according to some embodiments of the present disclosure.
Figure 29:
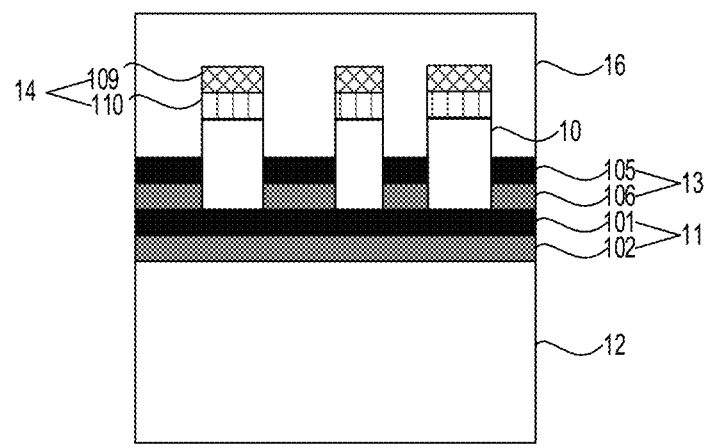
FIG. 29 is a schematic diagram showing the result of a process in FIG. 28 according to some embodiments of the present disclosure.
Figure 30:
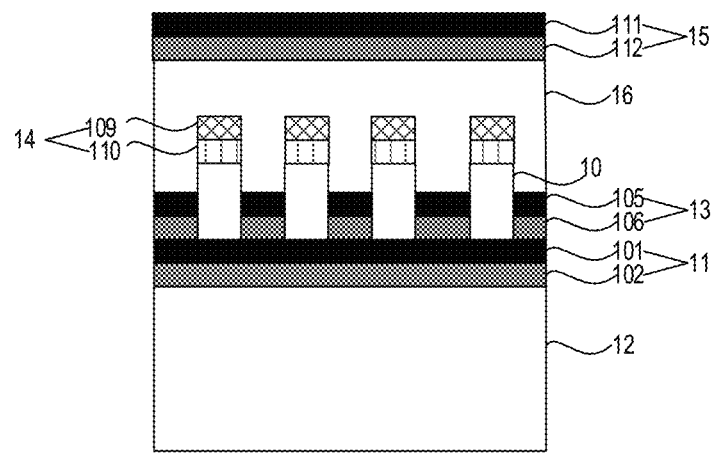
FIG. 30 is a schematic diagram showing the result of a process in FIG. 28 according to some embodiments of the present disclosure.

FIG. 28 is a schematic flowchart of a method 2800 for fabricating a metasurface optical device according to some embodiments of the present disclosure. FIGS. 29 and 30 sequentially illustrate schematic diagrams of the method 2800 shown in FIG. 28 according to some embodiments of the present disclosure.

At 2801, a first film layer is formed on the first surface of the substrate.

At 2802, a metasurface structural unit array is formed on a side of the first film layer away from the substrate.

Process 2801 and process 2802 are the same as process 801 and process 802 and the descriptions thereof are not repeated here.

At 2803, a protective material layer is deposited to surround each metasurface structural unit of the plurality of metasurface structural units.

By taking the optical device 2700-2 shown in FIG. 27 as an example, the optical device 2700-2 is further processed to deposit the protective material layer 16 on the plurality of metasurface structural units 10.

At 2804, the protective material layer is planarized.

The deposited protective material layer 16 can be polished and planarized through chemical mechanical polishing (CMP) to obtain an optical device 2900 shown in FIG. 29.

At 2805, a fourth film layer is formed on a side of the protective material layer away from the substrate. The fourth film layer includes at least one film group. Each film group includes at least a film stacked in the thickness direction of the substrate. Each film includes a material with a corresponding refractive index to enhance transmission and/or reflection of light.

The optical device 2900 can be further processed to form the fourth film layer 15 on a side of the protective material layer 16 away from the substrate 23 to obtain an optical device 3000 shown in FIG. 30. The fourth film layer 15 includes two films (film 111 and film 112) stacked in the thickness direction of the substrate 12.

The optical device 3000 has the same structure as the optical device 500 shown in FIG. 5.

In some embodiments, the method 800 can further include forming a fifth film layer on a second surface of the substrate. The second surface can be opposite to the first surface of the substrate in the thickness direction of the substrate. The fifth film layer can include at least one film group distributed at different locations on the second surface. Each film group can include at least one film stacked in the thickness direction of the substrate. Each film can include a material with a corresponding refractive index to enhance transmission and/or reflection of light.

Figure 31:
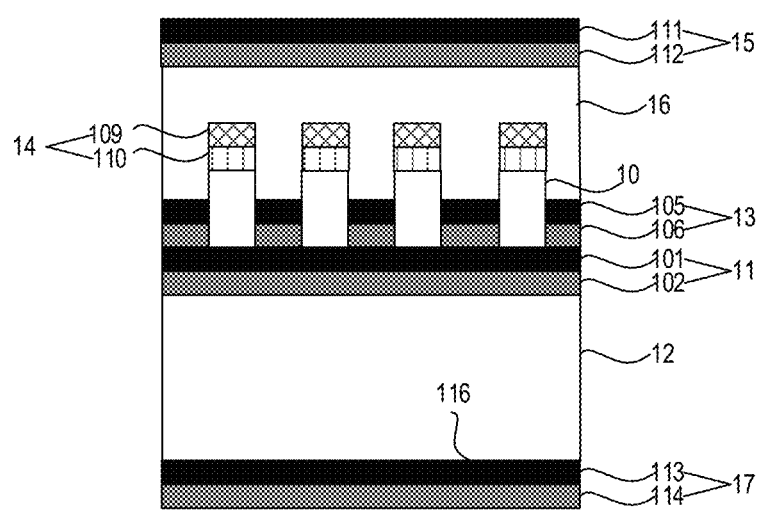
FIG. 31 is a schematic diagram illustrating a method for fabricating a metasurface optical device according to some embodiments of the present disclosure.

FIG. 31 is a schematic diagram illustrating a method for fabricating a metasurface optical device according to some embodiments of the present disclosure. For example, the optical device 3000 can be further processed to deposit a fifth film layer 17 on the second surface 116 of the substrate. The fifth film layer 17 includes two films (film 113 and film 114) stacked in the thickness direction of the substrate 12 to obtain an optical device 3100 shown in FIG. 31.

The optical device 3100 has the same structure as the optical device 600 shown in FIG. 6.

In some embodiments, each metasurface structural unit of the plurality of metasurface structural units can include a plurality of distributed feedback films stacked with each other in the thickness direction of the substrate.

In some embodiments, the above metasurface structural unit can include the plurality of distributed feedback films stacked with each other in the thickness direction of the substrate, which is used to control characteristics such as polarization, amplitude, phase, polarization mode, and propagation mode of incident light. The plurality of feedback films can further be used to filter the light through high-pass filtering, low-pass filtering, or band-pass filtering.

Embodiments of the present disclosure further provide an optical system. The optical system can include the optical device above.

Although the present disclosure is described in detail in connection with the accompanying drawings and according to embodiments above, the description and illustration are exemplary not restrictive. The present disclosure is not limited to embodiments of the present disclosure. According to the accompanying drawings, disclosed contents, and the claims, those skilled in the art can understand variations of embodiments of the present disclosure. In the claims, the term "including" does not exclude the presence of other elements or steps not listed, "a" or "one" does not exclude multiple, and the term "a plurality of" refers to two or more. Certain measures described in different dependent claims can be combined with each other to obtain advantages.

What is claimed is:

1. A metasurface optical device comprising:
   a substrate including a first surface and a second surface opposite to each other in a thickness direction of the substrate;
   a film layer formed on the first surface of the substrate and including at least one film group distributed at different positions of the first surface, each film group including one film or a plurality of films stacked one over another in the thickness direction of the substrate, and the one film or each of the plurality of films including a material with a corresponding refractive index to enhance transmission of light; and
   a metasurface structural unit array including a plurality of metasurface structural units formed on a side of the film layer away from the substrate and extending in a direction away from the substrate.

2. The metasurface optical device according to claim 1, wherein:
   the at least one film group includes a first film group and a second film group;
   the first film group and the second film group are made of different materials; and
   each metasurface structural unit of the plurality of metasurface structural units is directly on a corresponding portion of the first film group.

3. The metasurface optical device according to claim 1, wherein the film layer is a first film layer,
   the metasurface optical device further comprising:
   a second film layer formed on a surface of the first film layer away from the substrate and including at least one film group distributed at different positions of the surface of the first film layer away from the substrate, each film group of the second film layer including one film or a plurality of films stacked one over another in the thickness direction of the substrate, the one film or each of the plurality of films of the each film group of the second film layer including a material with a corresponding refractive index to enhance transmission and/or reflection of light, and the plurality of metasurface structural units extending beyond the second film layer in the direction away from the substrate.

4. The metasurface optical device according to claim 3, further comprising:
   a third film layer formed on one end of the plurality of metasurface structural units away from the substrate and including at least one film group distributed at different metasurface structural units, each film group of the third film layer including one film or a plurality of films stacked one over another in the thickness direction of the substrate, and the one film or each of the plurality of films of the each film group of the third film layer including a material with a corresponding refractive index to enhance transmission and/or reflection of light.

5. The metasurface optical device according to claim 4, wherein the third film layer is made of a same material as the second film layer.

6. The metasurface optical device according to claim 4, wherein the third film layer and the second film layer are made of different materials.

7. The metasurface optical device according to claim 4, further comprising:
   a fourth film layer formed on one side of the plurality of metasurface structural units away from the substrate and including at least one film group, each film group of the fourth film layer including one film or a plurality of films stacked one over another in the thickness direction of the substrate, and the one film or each of the plurality of films of the each film group of the fourth film layer including a material with a corresponding refractive index to enhance transmission and/or reflection of light; and
   a protective material layer formed between the fourth film layer and the first film layer.

8. The metasurface optical device according to claim 1, wherein the film layer is a first film layer;
   the metasurface optical device further comprising:
   a second film layer formed on the second surface of the substrate and including at least one film group distributed at different positions of the second surface, each film group of the second film layer including one film or a plurality of films stacked one over another in the thickness direction of the substrate, and the one film or each of the plurality of films of the each film group of the second film layer including a material with a corresponding refractive index to enhance transmission and/or reflection of light.

9. The metasurface optical device according to claim 1, wherein each metasurface structural unit of the plurality of metasurface structural units includes a plurality of distributed feedback films stacked one over another in the thickness direction of the substrate.

10. A method for manufacturing a metasurface optical device comprising:
    forming a film layer on a surface of a substrate, the film layer including at least one film group distributed at different positions of the surface, each film group including one film or a plurality of films stacked one over another in a thickness direction of the substrate, and the one film or each of the plurality of films including a material with a corresponding refractive index to enhance transmission of light; and forming a metasurface structural unit array on a side of the film layer away from the substrate, the metasurface structural unit array including a plurality of metasurface structural units extending in a direction away from the substrate.

11. The method according to claim 10, wherein:
the at least one film group of the film layer includes a first film group and a second film group;
the first film group and the second film group are made of different materials; and
forming the film layer on the surface of the substrate includes:
  sequentially forming a film material layer, a sacrificial layer, a mask material layer, and a photoresist material layer that are stacked one over another on the surface of the substrate;
  patterning the photoresist material layer and the mask material layer through photolithography and etching to expose a portion of the sacrificial material layer;
  etching the exposed portion of the sacrificial material layer and a corresponding portion of the film material layer under the exposed portion of the sacrificial material layer to form the first film group and expose a portion of the substrate; and
  forming the second film group on the exposed portion of the substrate.

12. The method according to claim 10, wherein forming the metasurface structural unit array on the side of the film layer away from the substrate includes:
  sequentially forming a metasurface material layer, a mask material layer, and a photoresist material layer one over another on a side of the film layer away from the substrate;
  patterning the photoresist material layer and the mask material layer through photolithography and etching to expose a portion of the metasurface material layer; and
  etching the exposed portion of the metasurface material layer to form the metasurface structural unit array.

13. The method according to claim 12,
wherein the exposed portion of the metasurface material layer is etched to expose the portion of the film layer, the film material layer is a first film material layer, and the film layer is a first film layer;
the method further comprising:
  depositing a second film material layer on the exposed portion of the first film layer and at one end of the plurality of metasurface structural units away from the substrate, wherein the second film material layer deposited on the exposed portion of the first film layer forms a second film layer, and the second film material layer deposited at the end of the plurality of metasurface structural units away from the substrate forms a third film layer, each of the second film layer and the third film layer includes at least one film group, each film group of the second film layer and the third film layer includes one film or a plurality of films stacked one over another in the thickness direction of the substrate, and the one film or each of the plurality of films of the each film group of the second film layer and the third film layer includes a material with a corresponding refractive index to enhance transmission and/or reflection of light.

14. The method according to claim 10, wherein:
the film layer is a first film layer;
the film material layer is a first film material layer; and
forming the metasurface structural unit array on the side of the first film layer away from the substrate includes:
  sequentially forming a second film material layer, a sacrificial material layer, a mask material layer, and a photoresist material layer stacked over another on a side of the first film layer away from the substrate, the second film material layer including at least one film group, each film group of the second film material layer including at least one film or a plurality of films stacked one over another in the thickness direction of the substrate, and the one film or each of the plurality of films of the each film group of the second film material layer including a material with a corresponding refractive index to enhance transmission and/or reflection of light;
  patterning the photoresist material layer and the mask material layer through photolithography and etching to expose a portion of the sacrificial material layer;
  etching the exposed portion of the sacrificial material layer and a corresponding portion of the second film material layer under the exposed portion of the sacrificial material layer to obtain a second film layer and expose a portion of the first film layer; and
  forming the plurality of metasurface structural units on the exposed portion of the first film layer, the plurality of metasurface structural units extending beyond the second film layer in a direction away from the substrate.

15. The method according to claim 14, further comprising:
  forming a third film layer at one end of the plurality of metasurface structural units away from the substrate, the third film layer includes at least one film group, each film group of the third film layer including one film or a plurality of films stacked one over another in the thickness direction of the substrate, and the one film or each of the plurality of films including a material with a corresponding refractive index to enhance transmission and/or reflection of light.

16. The method according to claim 10,
wherein the film layer is a first film layer;
the method further comprising:
  depositing a protective material layer to surround each metasurface of the plurality of metasurface structural units;
  planarizing the protective material layer; and
  forming a second film layer on a side of the protective material layer away from the substrate, wherein the second film layer includes at least one film group, each film group of the second film layer includes one film or a plurality of films stacked one over another in the thickness direction of the substrate, and the one film or each of the plurality of films of the each film group of the second film layer includes a material with a corresponding refractive index to enhance transmission and/or reflection of light.

17. The method according to claim 10, wherein each metasurface structural unit of the plurality of metasurface structural units includes a plurality of distributed feedback films stacked one over another in the thickness direction of the substrate.

18. The method according to claim 10,
wherein the film layer is a first film layer and the surface of the substrate is a first surface of the substrate;

the method further comprising:
forming a second film layer on a second surface of the substrate, wherein the second surface is opposite to the first surface in the thickness direction of the substrate, and the second film layer includes at least one film group distributed at different positions of the second surface, each film group includes one film or a plurality of films stacked one over another in the thickness direction of the substrate, and the one film or each of the plurality of films of the second film layer includes a material with a corresponding refractive index to enhance transmission and/or reflection of light.

19. An optical system comprising an optical device including:
a substrate including a first surface and a second surface opposite to each other in a thickness direction of the substrate;
a film layer formed on the first surface of the substrate and including at least one film group distributed at different positions of the first surface, each film group including one film or a plurality of films stacked one over another in the thickness direction of the substrate, and the one film or each of the plurality of films including a material with a corresponding refractive index to enhance transmission of light; and
a metasurface structural unit array including a plurality of metasurface structural units formed on a side of the first film layer away from the substrate and extending in a direction away from the substrate.

20. The optical system according to claim 19, wherein:
the at least one film group includes a first film group and a second film group;
the first film group and the second film group are made of different materials; and
each metasurface structural unit of the plurality of metasurface structural units is directly on a corresponding portion of the first film group.

* * * * *